/= 3,753,942
Patented Aug. 21, 1973

3,753,942
POLY(VINYLIDENE FLUORIDE) COMPOSITIONS

Edward E. Moran, Worthington, Ohio, and Jeffrey J. Wine, Los Angeles, Calif., assignors to PPG Industries, Inc., Pittsburgh, Pa.
No Drawing. Filed Sept. 6, 1968, Ser. No. 758,130
Int. Cl. C08f 45/34, 45/36, 45/44
U.S. Cl. 260—30.2
13 Claims

ABSTRACT OF THE DISCLOSURE

Compositions comprising poly(vinylidene fluoride) in a solvent mixture containing 10 to 70 percent of 2-pyrrolidone have unique properties including the ability to form continuous films of excellent adhesion by baking at relatively low temperatures, even when the poly(vinylidene fluoride) is the only resinous component present in the composition. The solvent mixture preferably includes an ester and a ketone.

BACKGROUND OF THE INVENTION

Poly(vinylidene fluoride) is a polymeric material which has been known for many years. It has unusual properties which are desirable in many applications but because of certain problems, such as difficulty in forming continuous films of poly(vinylidene fluoride), it has not been extensively utilized in coatings. More recently, there has been increased interest in coating compositions containing poly(vinylidene fluoride) and it has been found that combinations of poly(vinylidene fluoride) and certain acrylate polymers can be dispersed in certain solvents to provide compositions which can be baked to provide usable coatings. Such compositions are described, for example, in U.S. Pats. 3,324,069 and 3,340,222 and in British Pats. 1,049,088 and 1,049,089. Among the solvents which have been employed with poly(vinylidene fluoride) in this manner, although not included among those which have been preferred, are certain substituted pyrrolidones such as N-methyl-2-pyrrolidone.

BRIEF SUMMARY OF THE INVENTION

It has now been found that the use of a volatile solvent mixture containing 2-pyrrolidone provides dispersions of poly(vinylidene fluoride) which have unique properties not attained with other solvents, including those mentioned above. Such compositions can be baked at relatively low temperatures, e.g., below about 450° F. and as low as 300 to 350° F., and when baked at such temperatures provide continuous fused films even when the composition does not include acrylate polymers, plasticizers, or other additional non-volatile or resinous materials. Furthermore, the coatings obtained have excellent adhesion to most substrates, including aluminum, steel and other metals, and have outstanding durability and similar properties.

DETAILED DESCRIPTION OF THE INVENTION

The invention relates to compositions comprising poly(vinylidene fluoride) dispersed in a solvent mixture containing 2-pyrrolidone. Poly(vinylidene fluoride), as referred to herein, is a relatively high molecular weight homopolymer of vinylidene fluoride as described, for instance, in U.S. Pats, 2,435,537, 3,031,437 and 3,193,-539, as well as in the patents referred to above. While ordinarily the homopolymer is employed, copolymers of vinylidene fluoride with small amounts of other comonomers having substantially equivalent properties are also included. Such copolymers may contain, for example, as much as 5 or 10 percent of other ethylenically unsaturated monomers, such as ethylene, tetrafluoroethylene, chlorotrifluoroethylene, and the like.

The solvent mixtures employed herein contain from about 10 percent to about 70 percent by weight based on the total solvent of 2-pyrrolidone, which is a high boiling (boiling point about 245° C.) material of the formula

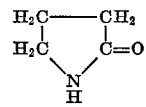

It should be noted that 2-pyrrolidone as employed in the present invention has unique properties not provided by other proposed solvents for poly(vinylidene fluoride), such as butyrolactone, dimethylacetamide, dimethylformamide, and the like. Even closely related solvents which have been suggested, such as N-methyl-2-pyrrolidone, do not produce the same effect as does 2-pyrrolidone and cannot be utilized in the same manner as the 2-pyrrolidone in the present invention.

The solvent mixture herein also contains one or more other volatile liquid organic solvent, essentially any such solvent which is compatible with the 2-pyrrolidone can be employed. The preferred classes of such other solvents are esters and ketones, although other materials can be employed in some cases, including alcohols, amides, lactones, sulfones, nitroparaffins, etc. Examples of these solvents are described in the patents mentioned above. Hydrocarbons are not ordinarily compatible with 2-pyrrolidone and thus are not generally useful herein, although certain hydrocarbons and hydrocarbon derivatives, e.g. halogenated or oxygenated hydrocarbons, may in some instances be utilized.

In order to provide compositions which can be easily processed and used and which have the properties described herein, it is ordinarily necessary that at least about 10 percent of the solvent mixture be 2-pyrrolidone, the remainder being one or more of the other solvents mentioned. When the solvent contains less than about 10 percent of 2-pyrrolidone, poorer film coalescence tends to occur, leading to edge cracking and peel-back when employed in coatings and baked at the temperatures indicated above. While equivalent results for some purposes are obtained when the entire solvent is composed of 2-pyrrolidone and thus 100 percent 2-pyrrolidone can sometimes be used, poly(vinylidene fluoride) dispersed in 2-pyrrolidone alone is ordinarily difficult to handle and process because it tends to be thick and pasty. Thus, for practical purposes the upper limit of the 2-pyrrolidone in the solvent mixture is about 70 percent. In most cases, the proportion of 2-pyrrolidone in the solvent mixture is between about 20 percent and about 50 percent by weight.

It is preferred that the solvent mixture include an ester in addition to 2-pyrrolidone. Especially desirable esters are esters of monoalkyl ethers of ethylene glycol or diethylene glycol. The presence of such an ester aids in obtaining good adhesion to many substrates, such as aluminum or steel, to which these compositions are applied. Carbitol acetate, i.e. diethylene glycol monoethyl ether acetate, is a specific preferred ester for use in conjunction with 2-pyrrolidone. Other useful esters include butyl Carbitol acetate, Cellosolve acetate and similar mono- or di-ethylene glycol ether esters of saturated carboxylic acids, particularly lower aliphatic monocarboxylic acids. There can also be utilized other carboxylic acid esters, such as isopropyl acetate, amyl acetate, butyl propionate, etc. Very high boiling, non-volatile esters commonly utilized, as plasticizers can be used but are not necessary, the preferred esters being volatile organic esters.

It is also desirable to include a ketone, preferably a low-boiling ketone such as acetone, in the solvent mixture.

This is especially true when a composition is to be applied to a substrate by spraying; the presence of acetone assists in obtaining good spray patterns, particularly when metallic pigments are present. Other ketones which also can be used include methyl ethyl ketone, methyl isobutyl ketone, cyclohexanone, isophorone, and the like.

The overall preferred solvent system contains (a) from about 20 percent to about 50 percent of 2-pyrrolidone, (b) from about 20 percent to about 60 percent of one or more esters of a monoalkyl ether of ethylene glycol or diethylene glycol, and (c) from about 10 percent to about 40 percent of one or more ketones. A specific preferred solvent mixture contains Carbitol acetate and acetone in addition to the 2-pyrrolidone.

Poly(vinylidene fluoride), when mixed with the solvent mixture described, provides at ordinary temperatures a stable dispersion. In these dispersions, the poly(vinylidene fluoride) may be partially dissolved but it is believed that the individual particles of poly(vinylidene fluoride) are solvated and swelled to form a colloidal suspension in the solvent. When the composition is heated, further solvating of the poly(vinylidene fluoride) takes place.

The proportion of poly(vinylidene fluoride) which can be dispersed in the solvent mixture varies depending upon considerations such as the particular composition of the solvent mixture and the desired viscosity of the final composition. In most cases, the composition contains from about 30 to about 60 percent of poly(vinylidene fluoride), based on the total weight of solvent plus poly(vinylidene fluoride), with preferred compositions containing from about 35 to about 50 percent of poly(vinylidene fluoride).

The compositions herein are primarily useful as the vehicle for coating compositions. One important advantage of these compositions is that they do not require other resinous materials, such as the acrylate polymers described in the prior art and/or non-volatile or resinous plasticizers, in order to form adherent, continuous films upon baking. This is the case even when the coatings are baked at relatively low temperatures, i.e. 300 to 450° F. However, minor amounts of additional resinous materials, such as acrylate polymers or other polymeric or plasticizing materials, can be included if desired. In addition, stabilizers, antioxidants, fillers, and other additives commonly employed in the formulation of coatings can also be included.

The compositions herein can be used to provide clear coatings or there can be produced pigmented coating compositions utilizing the present dispersions of poly(vinylidene fluoride). Such pigmented compositions can contain essentially any of the pigments commonly employed in compositions of this general class, including white, colored and metallic pigments, as well as opaque and other inert pigments.

The coating compositions herein are applied to various substrates by ordinary methods, such as by spraying, roll coating, brushing, dipping or the like. The usual substrates are aluminum or steel, but other metals, such as copper, tin, etc., can also be coated with these materials, as can other substrates such as glass, plastics, wood and the like, provided the substrate can withstand the baking temperature required.

As mentioned above, these compositions can be baked at relatively low temperatures compared to most conventional poly(vinylidene fluoride) coatings. In most cases, temperatures as low as about 275° F. (preferably between about 300° F. and about 500° F.) are sufficient to provide smooth, fused, continuous films. Temperatures above 450° F. are not usually necessary but are sometimes used to insure adequate film coalescence when the peak temperature is attained for only a short period of time, such as is often the case in industrial high speed coating operations. The time of baking varies and is correlated with the temperature, but is generally from about 60 seconds to about 30 minutes. In any baking schedule, an important consideration is the temperature which is reached at the surface of the particular substrate employed.

The invention will be further described in connection with the several examples which follow. However, these examples should not be construed to limit the invention to their details since they are presented only as illustrations of the preparation and utility of the compositions. All parts are by weight unless otherwise indicated.

In the examples, the commercial grade of 2-pyrrolidone sold as "2-Pyrol" was used, and the poly(vinylidene fluoride) employed was the commercially available material having the following properties:

Melting point (crystalline): 340° F.
Specific gravity: 1.76
Refractive index, $n_D^{25}$ 1.42
Tensile strength (77° F.) 7000 p.s.i.

EXAMPLE 1

The following were mixed together using a Cowles Dissolver:

| | Parts by weight |
|---|---|
| Poly(vinylidene fluoride) | 451.3 |
| 2-pyrrolidone | 72.2 |
| Carbitol acetate | 270.8 |

The resulting mixture was then thoroughly blended with the following:

| | Parts by weight |
|---|---|
| Aluminum pigment paste (65 percent aluminum in mineral spirits) | 22.6 |
| 2-pyrrolidone | 90.4 |
| Acetone | 117.4 |

There was obtained a silver metallic coating composition which had a viscosity of 19 seconds (No. 4 Ford cup) and contained 45.5 percent total non-volatile solids. It was sprayed onto aluminum panels (6061 alloy pretreated with Alodine 407–47) at a dry film thickness of 0.9–1.0 mil; the coating was allowed to dry at ambient conditions for 8 minutes and then baked at 350° F. for 30 minutes. A continuous coating, excellent in appearance, was obtained; there was no peeling from the edges of the panel and the coating had the following properties:

Hardness (pencil): H
Gloss (60° Gardner Glossmeter): 33
Salt spray resistance: [1] Passes
Adhesion: Excellent
Gloss retention: [2] 73 percent

[1] 1000 hours in 5 percent NaCl solution at 100° F. (ASTM D–1735–62).
[2] Percent gloss retained after 800 hours exposure in "Weather-O-Meter," read on 60° glossmeter.

As indicated above, the coating obtained in the foregoing example had highly desirable properties, even though baked at 350° F. In order to demonstrate the varying baking schedules which can be employed with the compositions of the invention, coated panels made as in the above example were baked as follows:

| Temperature, ° F. | Time | |
|---|---|---|
| 300 | minutes | 30 |
| 400 | do | 15 |
| 450 | do | 10 |
| 500 | seconds | 90 |

In all cases, continuous coatings of desirable properties, substantially equivalent to those above, were obtained. Immersion of the films in acetone for 24 hours to determine the extent of solution in acetone as a measure of the degree of film coalescence showed little differences among the films baked at the various temperatures.

EXAMPLE 2

A coating composition was prepared as in Example 1 except that the aluminum pigment was omitted and titanium dioxide pigment was included at a pigment to binder ratio of 1 to 1. A white enamel was obtained which was sprayed onto aluminum and baked at 350° F. for 30 minutes. There was obtained a smooth, hard, continuous coating of properties comparable to those obtained in Example 1.

EXAMPLE 3

Demonstrating the unique properties of 2-pyrrolidone in the invention as described was a series of tests in which the following unpigmented compositions were prepared:

| Composition | Parts by weight | | |
|---|---|---|---|
| | A | B | C |
| Poly(vinylidene fluoride) | 50 | 50 | 50 |
| Carbitol acetate | 43 | 43 | 43 |
| 2-pyrrolidone | 19 | | |
| Butyrolactone | | 19 | |
| N-methyl-2-pyrrolidone | | | 19 |

Each of the above was drawn down (about 3 mils thick wet film) on polished steel and baked for 30 minutes at 300° F. Compositions B and C did not form good films and curled and peeled off of the panels; Composition A formed a continuous film with no peel-back. The test was repeated except that the coated panels were baked at 350° F. for 30 minutes; the results were similar and only Composition A formed an adherent, continuous film.

EXAMPLE 4

A silver metallic coating composition was made similar to that of Example 1. For comparison, corresponding compositions were made using butyrolactone and N-methyl-2-pyrrolidone in place of 2-pyrrolidone. These compositions were then applied to steel panels and then baked for 15 minutes at 400° F. The results are shown below:

| Solvent: | Appearance |
|---|---|
| 2-pyrrolidone | Good; no peel, continuous film. |
| Butyrolactone | Poor; peeled back at edges. |
| N-methyl-2-pyrrolidone | Gelled; could not be successfully applied. |

As shown, the composition containing 2-pyrrolidone again exhibited uniquely useful properties.

EXAMPLES 5-10

In order to illustrate the manner in which other solvent mixtures can be utilized, there were carried out several tests utilizing other solvent mixtures as described herein. These tests were carried out following the procedure of Example 1 but using different solvent mixtures. Although these solvent mixtures are less desirable than the preferred systems, the results obtained were entirely satisfactory and smooth, adherent, continuous coatings were obtained in each instance. Table I shows the data; the amounts of solvents employed in these examples are given in parts by weight:

TABLE I.—EXAMPLE 5-10

| Examples | 5 | 6 | 7 | 8 | 9 | 10 |
|---|---|---|---|---|---|---|
| 2-pyrrolidone | 50 | 50 | 50 | 50 | 50 | 50 |
| Carbitol acetate | 25 | 25 | | | | |
| Amyl acetate | | | | | 25 | |
| Isobutyl acetate | | | | | | 25 |
| Cellosolve acetate | | | 25 | 25 | | |
| Methyl ethyl ketone | 25 | | 25 | | | |
| Methyl isobutyl ketone | | 25 | | 25 | | |
| Isophorone | | | | | 25 | 25 |

In a similar manner, there can be employed other solvent mixtures in addition to those exemplified, including those containing varying levels of 2-pyrrolidone and other esters, ketones or other solvents. Provided that 2-pyrrolidone is present in the amounts described, the use of such solvent mixtures gives continuous coatings of properties which are satisfactory for most purposes and which can be baked at relatively low temperatures.

According to the provisions of the patent statutes, there are described above the invention and what are now considered to be its best embodiments. However, within the scope of the appended claims, it is to be understood that the invention can be practiced otherwise than as specifically described.

What is claimed is:

1. A film forming coating composition comprising poly(vinylidene fluoride) dispersed in a solvent mixture consisting essentially of
   (a) from about 10 percent to about 70 percent, based on the total weight of the solvent mixture, of 2-pyrrolidone, and
   (b) a volatile organic liquid compatible with 2-pyrrolidone, said liquid being volatile below about 500° F. and being selected from the group consisting of organic esters, ketones, and mixtures thereof.

2. The composition of claim 1 in which said liquid comprises an ester of a monoalkyl ether of ethylene glycol or diethylene glycol.

3. The composition of claim 1 in which said liquid comprises diethylene glycol monoethyl ether acetate.

4. The composition of claim 1 in which said liquid comprises a mixture of an ester and a ketone.

5. The composition of claim 4 in which said ester is an ester of a monoalkyl ether of ethylene glycol or diethylene glycol.

6. The composition of claim 4 in which said ketone is acetone.

7. The composition of claim 1 in which poly(vinylidene fluoride) is the only resinous component of said composition.

8. The composition of claim 1 in which said solvent mixture consists essentially of
   (a) from about 20 percent to about 50 percent by weight of 2-pyrrolidone,
   (b) from about 20 percent to about 60 percent by weight of an ester of a monoalkyl ether of ethylene glycol or diethylene glycol, and
   (c) from about 10 percent to about 40 percent by weight of ketone.

9. The composition of claim 7 in which said ester is diethylene glycol monoethyl ether acetate and said ketone is acetone.

10. A coating composition comprising pigment and a vehicle consisting essentially of the composition of claim 1.

11. A coating composition comprising pigment and a vehicle consisting essentially of the composition of claim 7.

12. The composition of claim 1 containing from about 30 to about 60 percent of poly(vinylidene fluoride), based on the total weight of solvent and poly(vinylidene fluoride).

13. A coating composition comprising pigment and a vehicle consisting essentially of the composition of claim 12.

References Cited

UNITED STATES PATENTS

| 2,918,443 | 12/1959 | Roeser | 260—30.2 |
| 3,215,658 | 11/1965 | Forchielli | 260—30.2 |
| 3,324,069 | 6/1967 | Koblitz et al. | 260—31.4 |
| 3,429,844 | 2/1969 | Neros et al. | 260—30.2 |
| 3,228,882 | 1/1966 | Harle et al. | 252—62.5 |

OTHER REFERENCES

Burrell, "Solubility Parameters for Film Formers," Official Digest, October 1955, p. 741, Crowley et al., Journal of Paint Technology, vol. 38, No. 496, May 1966, p. 272.

ALLAN LIEBERMAN, Primary Examiner

U.S. Cl. X.R.

260—30.4 R, 30.8 R, 31.4 R, 32.4, 32.6 R, 41 R